United States Patent [19]
Hayami et al.

[11] Patent Number: 5,474,789
[45] Date of Patent: Dec. 12, 1995

[54] TREATING METHOD FOR KEEPING FOOD FRESH

[75] Inventors: Yasuaki Hayami, Kurita; Satoru Tajika, Gamo; Kiyoshi Asanari, Osaka; Yoshiteru Ito, Tokyo, all of Japan

[73] Assignees: Sekisui Jushi Kabushiki Kaisha; Kabushiki Kaisha Nissen Tekuno, both of Osaka, Japan

[21] Appl. No.: 102,824

[22] Filed: Aug. 6, 1993

[30] Foreign Application Priority Data

Aug. 7, 1992 [JP] Japan ................................. 4-211691

[51] Int. Cl.⁶ ........................................... A23L 3/3409
[52] U.S. Cl. ........................... 426/335; 422/30; 422/31; 422/292
[58] Field of Search ............................ 476/262, 263, 476/532, 321, 326, 335, 654; 422/30, 292, 31

[56] References Cited

U.S. PATENT DOCUMENTS 3,840,179  10/1974  Krohn et al. ........................ 239/1
3,907,202   9/1975  Binoche .............................. 239/15
4,402,315   9/1983  Tsuda et al. ..................... 128/200.18
4,729,899   3/1988  Volk, Jr. et al. ................... 426/438
5,246,663   9/1993  Ohama et al. ....................... 422/30

FOREIGN PATENT DOCUMENTS 64-31109  2/1989  Japan .
 2-79933  3/1990  Japan .
3-101604  4/1991  Japan .

Primary Examiner—Anthony J. Weier
Attorney, Agent, or Firm—Armstrong, Westerman, Hattori, McLeland & Naughton

[57] ABSTRACT

Here is described a method of maintaining freshness and quality of perishable foodstuffs, by preventing rot by controlling bacteria sticking to food and sterilizing food, such as fresh meat, fish, vegetable, fruit, egg, and processed food such as ham and sausage. This treating method for keeping food fresh is characterized by spraying and mixing separately prepared wasabi solution and water in an enclosed container for containing food in, and generating wasabi gas in the enclosed container.

9 Claims, 3 Drawing Sheets

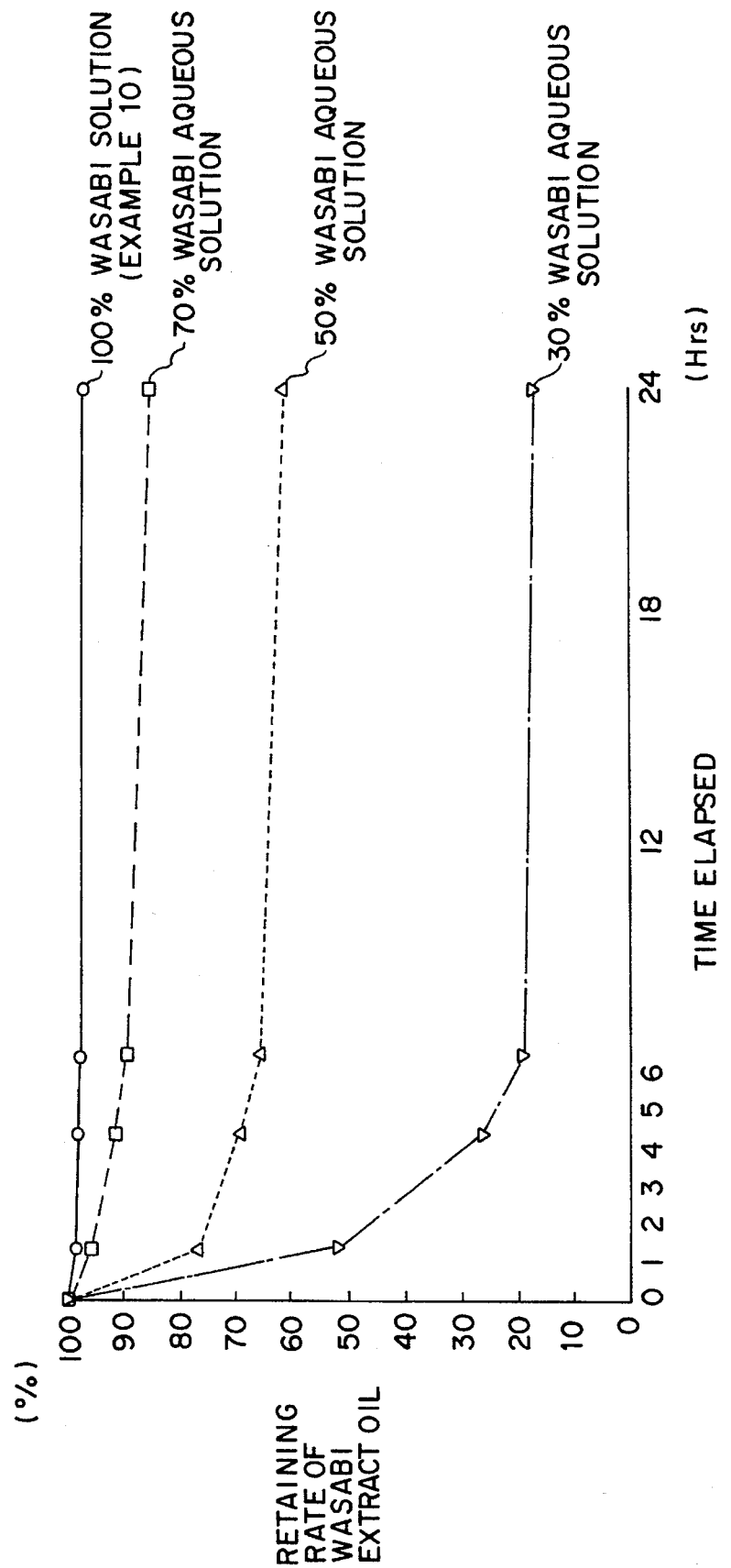

TREATING METHOD FOR KEEPING FOOD FRESH

BACKGROUND OF THE INVENTION

1. Field of the Invention

The present invention relates to a method of maintaining freshness and quality of perishable foodstuffs, by preventing rot by controlling bacteria sticking to food and sterilizing food, such as fresh meat, fish, vegetable, fruit, egg, and processed food such as ham and sausage.

2. Brief Description of the Prior Art

Among methods for keeping freshness or quality of food hitherto, various methods using isothiocyanic ester which is a principal ingredient of wasabi have been proposed.

Methods for controlling bacteria sticking to food and sterilizing food by keeping the surface of food in direct contact with wasabi solution are known, for example, a method of preventing formation of fungi by immersing fruit or vegetable in a dispersed aqueous solution of wasabi without putting in a refrigerator (Japanese Laid-open Patent Hei. 2-79933), and a method of preventing formation of fungi by spraying a dispersed ethanol solution of wasabi directly to food. (Japanese Laid-open Patent Hei. 1-31109).

Also known is a method of controlling and killing bacteria in the entire atmosphere in an enclosed space, such as a method of sterilizing the enclosed space such as factory, warehouse and hold of a ship by using vapor of isothiocyanic ester (Japanese Laid-open Patent Hei. 3-101604).

In these prior arts, however, the following inconveniences are caused.

That is, isothiocyanic ester, the principle ingredient of wasabi, is a liquid not soluble in water, and when it is dispersed in water, it becomes unstable and generates so-called wasabi gas. Therefore, when immersing fruit or vegetable in this aqueous solution, it must be used shortly after preparing the aqueous solution, and when left over, the effect is lost in the course of time. On the other hand, when ethanol is used as the solvent, since the isothiocyanic ester is dissolved, the stability is increased, but since the isothiocyanic ester is enveloped in the solution, the part of the food not contacting with the solution lacks in the fungistatic and fungicidic effect. It is hence necessary to spray uniformly on the whole surface of the food, which is bothering. Or, by using an ethanol aqueous solution mixing ethanol and water as the solvent, it may be considered to obtain a stable wasabi solution generating wasabi gas in good balance, but since water is contained, although the effect is extended, it must be used shortly after preparation.

Anyway, in these methods, by direct contact of wasabi solution with the surface of food, the fungistatic and fungicidic effects are obtained only on the surface of the food, and the entire atmosphere lacks the fungistatic and fungicidic effects, the effects fade away shortly unless the food is contained in a relatively small enclosed container to keep the atmospheric volume to contact with the food small. Besides, since the surface of the food is moistened, it cannot be applied to the food vulnerable to moisture.

By contrast, in the case of sterilizing by filing an enclosed space with vapor of isothiocyanic ester, the above inconveniences are eliminated, but it requires heating mechanism or cooling mechanism for generating vapor of isothiocyanic ester, and the facility is costly.

The invention is devised in the light of such background, and is intended to present a treating method for keeping food fresh capable of feeding wasabi gas easily and stably in an enclosed space.

SUMMARY OF THE INVENTION

To solve the problems, the invention presents a treating method for keeping food fresh by spraying and mixing separately prepared wasabi solution and water in an enclosed space for containing food, and generating wasabi gas in the enclosed space.

According to the invention, since the wasabi solution and water are prepared separately, the wasabi solution does not become unstable, and by spraying and mixing the wasabi solution and water in an enclosed space, wasabi gas is generated efficiently in the enclosed space.

BRIEF DESCRIPTION OF THE DRAWINGS

FIG. 4 is a graph showing changes of retaining rate of wasabi extract oil in the course of time in wasabi solution and wasabi aqueous solution.

DETAILED DESCRIPTION OF THE PREFERRED EMBODIMENTS

An embodiment of the invention is described below by reference to the drawings.

Figure 1:
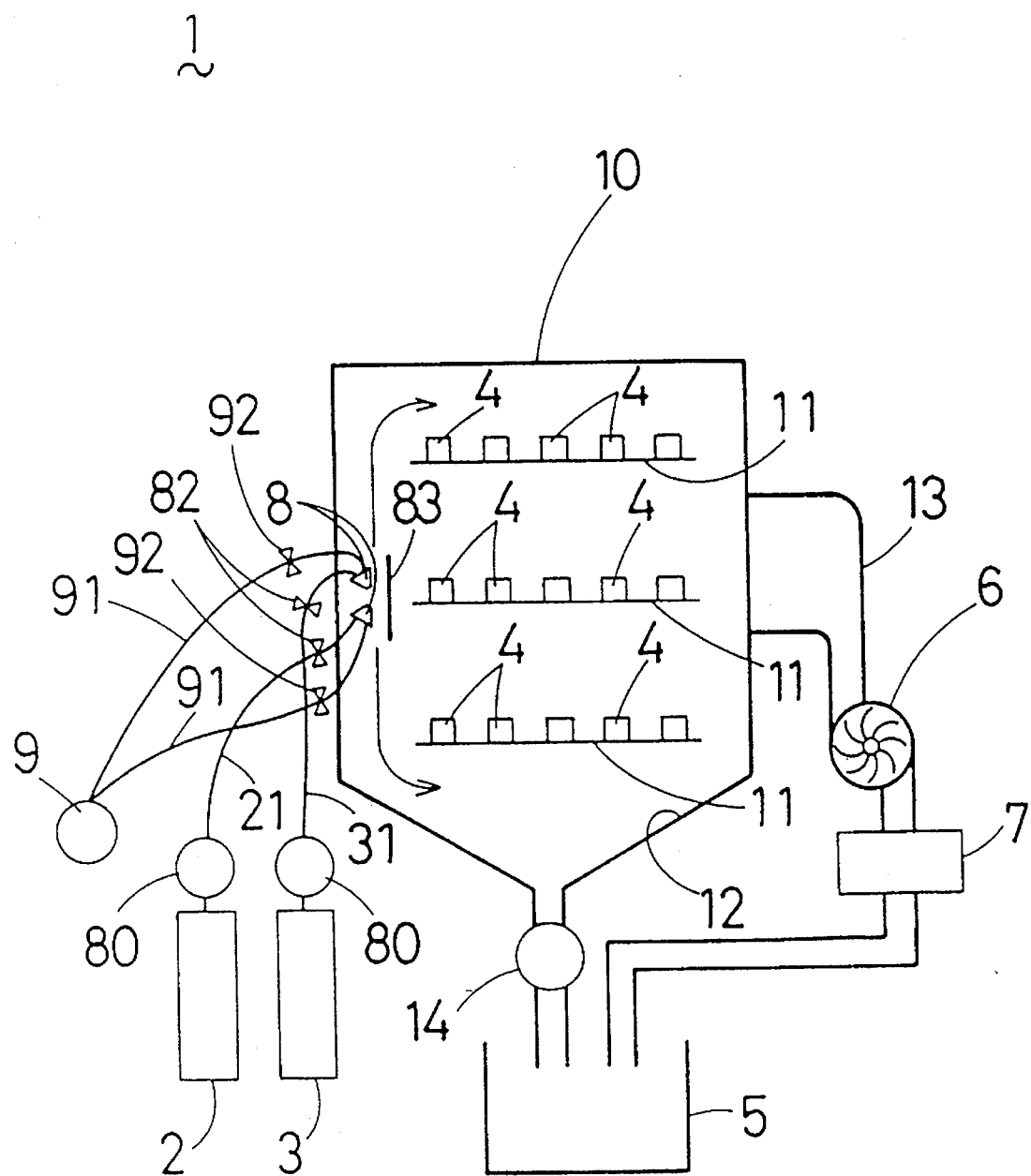
FIG. 1 is a block diagram showing a schematic general view of a treating apparatus for keeping fresh according to the invention.

FIG. 1 shows a schematic of the general construction of a treating apparatus 1 for keeping food fresh for realizing the invention.

That is, in the treating apparatus 1 for keeping fresh, wasabi solution 2 and water 3 are separately sprayed and mixed in an enclosed container 10 so as to generate wasabi gas in the enclosed container.

In the enclosed container 10, there are mesh shelves 11 for putting food 4 thereon. In the bottom of the enclosed container 10, a waste liquid trap 12 is formed as a taper to collect waste liquid after spraying. The waste liquid collected in the waste liquid trap 12 is led into a waste liquid recovery tank 5 by manipulating a bellows pump 14 provided at the lower end of the waste liquid trap 12. In the enclosed container 10, moreover, an exhaust duct 13 is provided to exhaust the air in the enclosed container 10, and the air in the enclosed container 10 is led into the waste liquid recovery tank 5 through an exhaust damper 7 by the action of an exhaust fan 6 provided on the way of the exhaust duct 13.

The wasabi solution 2 is prepared by dissolving isothiocyanic ester, the principal ingredient of wasabi, properly in ethanol. Ethanol is used as solvent in the embodiment, but any other organic solvent may be used as long as it is compatible with isothiocyanic ester, and is capable of stabilizing isothiocyanic ester in the dissolved state. However, it must not be harmful to the human health because it is sprayed in the enclosed container 10 containing food 4. The wasabi solution 2 is sprayed into the enclosed container 10 from a jet nozzle 8 together with water 3 provided separately.

Figure 2:
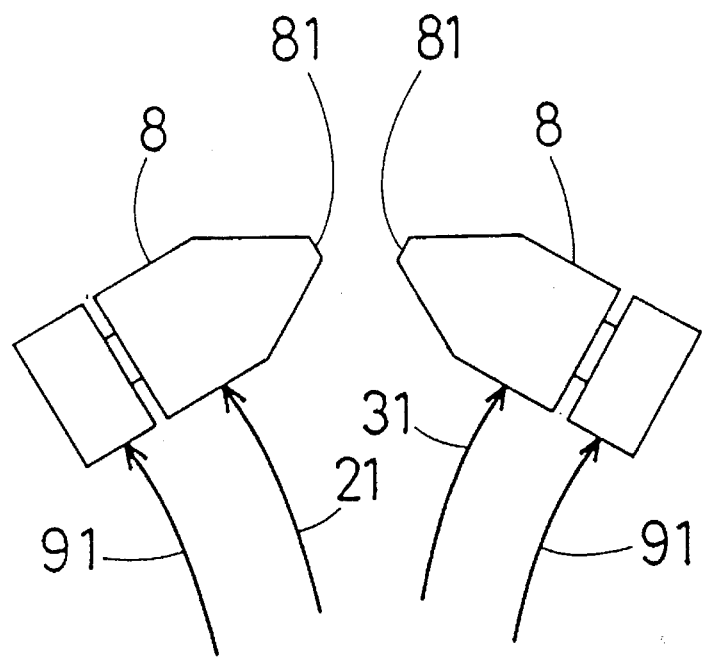
FIG. 2 is a partial magnified view showing a jet nozzle in the treating apparatus for keeping fresh.

As shown in FIG. 1 and FIG. 2, the jet nozzle 8 is composed of a pair of jet nozzles 8 so that the injection holes 81 may confront each other, and a wasabi solution lead pipe 21 and a water lead pipe 31 are connected to each jet nozzle 8 through bellow pump 80 and solenoid valve 82. A lead pipe 91 for air compressed by a compressor 9 is also connected to each jet nozzle 8 through solenoid valve 92, and the wasabi solution 2 and water 3 led to the jet nozzles 8 are atomized by the compressed air, and injected from the injection holes 81. A baffle plate 83 is provided before the jet nozzles 8. Liquid drops of relatively large particle size of the wasabi solution 2 and water 3 right after injection collide against the baffle plate 83, and these large drops directly drop from the baffle plate 83 to be led into the waste liquid trap 12. On the other hand, small drops are dispersed in the enclosed container 10 directly in suspended state. The dispersed wasabi solution 2 and water 3 are mixed as a fine mist in the enclosed container 10, and exist as wasabi gas and mist of ethanol aqueous solution. When the mist of ethanol aqueous solution increases in its absolute quantity in the enclosed container 10, it drips down the side wall of the enclosed container 10, and is recovered in the waste liquid recovery tank 5 from the waste liquid trap 12.

Figure 3:
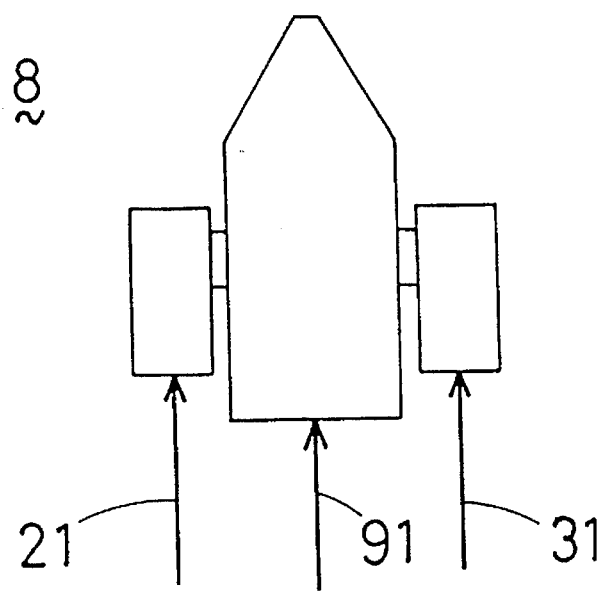
FIG. 3 is a plan showing another embodiment of the jet nozzle.

In this embodiment, two pairs of jet nozzles 8 are used, but as shown in FIG. 3, it is also contemplated to lead both wasabi solution 2 and water 3 into one jet nozzle 8, so as to mix in the jet nozzle 8 just before injection, and be sprayed by compressed air.

The timing of injecting the wasabi solution 2 and water 3 from the jet nozzle 8 is not limited particularly. For example, by detecting opening or closing of the enclosed container 10 by a sensor or the like, it may be designed to spray every time the door of the enclosed container 10 is closed. Alternatively, by detecting the wasabi gas concentration in the enclosed container 10, it may be designed to spray so as to maintain a specific gas concentration, or it may be designed to spray at every specified time by means of a timer or the like. Thus, by spraying a specified amount of wasabi solution 2 and water 3 into the enclosed container 10, the food 4 is not moistened as experienced when sprayed directly to the food 4, and the food 4 and wasabi gas are brought into mutual contact while the food 4 is substantially dry.

Various embodiments of the invention are described below.(Examples 1 to 10, Comparative Examples 1 to 6)
(1) Preparation of wasabi solution Wasabi extract oil (allyl isothiocyanate) was dissolved in ethanol at a rate of 0.01 to 10.0 wt. %, and wasabi solutions of concentrations shown in Table 1 were prepared.
(2) Wasabi gas generation test In treating apparatus for keeping food fresh according to the invention having volume in the enclosed container of 100 liters, 20 cc or wasabi solution and 20 cc of water were sprayed, and wasabi gas was generated in the enclosed container. The wasabi gas concentration in the enclosed container was measured by gas chromatography. The results are shown in Table 1.

By reference, only 20 cc of wasabi solution was sprayed similarly, and the wasabi gas concentration in the enclosed container was measured. The result is shown in Table 1.

TABLE 1

|  | Wasabi solution | | Distilled water | Wasabi gas |
| --- | --- | --- | --- | --- |
|  | Solution concentration | Spray volume cc | spray volume cc | concentration μl/l |
| Example 1 | 0.01% | 20 | 20 | 0.013 |
| Example 2 | 0.05% | 20 | 20 | 0.072 |
| Example 3 | 0.10% | 20 | 20 | 0.175 |
| Example 4 | 0.20% | 20 | 20 | 0.373 |
| Example 5 | 0.60% | 20 | 20 | 1.187 |
| Example 6 | 1.00% | 20 | 20 | 1.956 |
| Example 7 | 1.50% | 20 | 20 | 2.967 |
| Example 8 | 2.00% | 20 | 20 | 3.885 |
| Example 9 | 5.00% | 20 | 20 | 9.856 |
| Example 10 | 10.00% | 20 | 20 | 19.245 |
| Comparative Ex. 1 | 0.01% | 20 | 0 | 0 |
| Comparative Ex. 2 | 0.10% | 20 | 0 | 0 |
| Comparative Ex. 3 | 0.20% | 20 | 0 | 0.004 |
| Comparative Ex. 4 | 1.00% | 20 | 0 | 0.010 |
| Comparative Ex. 5 | 5.00% | 20 | 0 | 0.032 |
| Comparative Ex. 6 | 10.00% | 20 | 0 | 0.055 |

(3) Storage test

In the atmosphere of the enclosed container in Example 6, Example 9, Comparative Example 2 and Comparative Example 5, fresh tuna, fresh beef and chopped fresh cabbage were stored for specified time, and general viable cells were counted before and after storage. The results are shown in Table 2. The storage time was 48 hours for tuna, 72 hours for beef, and 48 hours for chopped cabbage.

TABLE 2

|  | Tuna | | Beef | | Chopped cabbage | |
| --- | --- | --- | --- | --- | --- | --- |
|  | Before storage | After storage | Before storage | After storage | Before storage | After storage |
| Example 6 | $5.5 \times 10^4$ | $8.7 \times 10^5$ | $2.4 \times 10^6$ | $1.2 \times 10^7$ | $8.7 \times 10^5$ | $6.9 \times 10^7$ |
| Example 9 | $5.5 \times 10^4$ | $9.7 \times 10^4$ | $2.4 \times 10^6$ | $8.1 \times 10^6$ | $8.7 \times 10^5$ | $4.8 \times 10^6$ |

TABLE 2-continued

|  | Tuna | | Beef | | Chopped cabbage | |
| --- | --- | --- | --- | --- | --- | --- |
|  | Before storage | After storage | Before storage | After storage | Before storage | After storage |
| Comparative Ex. 2 | $5.5 \times 10^4$ | $6.7 \times 10^7$ | $2.4 \times 10^6$ | $5.3 \times 10^9$ | $8.7 \times 10^5$ | $3.2 \times 10^8$ |
| Comparative Ex. 5 | $5.5 \times 10^4$ | $4.1 \times 10^6$ | $2.4 \times 10^6$ | $1.5 \times 10^8$ | $8.7 \times 10^5$ | $1.7 \times 10^9$ |

(4) Stability test of wasabi solution

The wasabi solution of Example 10 was diluted in water, and wasabi aqueous solutions at various concentrations were prepared. The concentration of the wasabi extract oil in these wasabi aqueous solutions was measured by gas chromatography at specific time intervals, and the retaining rate of wasabi extract oil in wasabi aqueous solution was measured in the course of time. The changes are graphically shown in FIG. 4.

As can be observed from the graph, in the case of the wasabi solution in Example 10, the retaining rate of wasabi extract oil was almost stable regardless of the duration of time, but in the ease of wasabi aqueous solution, as the concentration of wasabi solution declined, the retaining rate of wasabi extract oil was known to lower in the course of the time. For example, in the ease of wasabi aqueous solution diluting wasabi solution to 30%, the retaining rate was lowered to 50% in 2 hours after preparation. That is, if this wasabi aqueous solution is sprayed to the food, the effect is only half of the level right after preparation.

As described herein, accordingly the invention, wasabi gas can be generated efficiently by a simple operation of spraying and mixing merely wasabi solution and water in an enclosed container, without setting the wasabi solution in an unstable state. Therefore, by easily and stably supplying wasabi gas, bacteria adhering to meat, fish, vegetable, fruit, egg, processed products such as ham and sausage, and other food can be efficiently and securely controlled and killed to prevent rot, so that it is suited to maintain the freshness and quality of food.

What is claimed is:

1. A treating method for keeping food fresh comprising providing an enclosed container for containing food therein, separately providing a non-aqueous wasabi solution and water to said enclosed container, and spraying said wasabi solution and said water into the enclosed container to thereby generate sufficient wasabi gas to destroy germs contained in the enclosed container.

2. A treating method for keeping food fresh of claim 1, wherein the wasabi solution is prepared by dissolving isothiocyanic ester in an organic solvent which is compatible with the isothiocyanic ester, capable of stabilizing the isothiocyanic ester in a dissolved state, and harmless to human health.

3. A treating method for keeping food fresh of claim 1, wherein a pair of jet nozzles each having an injection hole are provided in the enclosed container so that the injection holes confront each other, the wasabi solution is sprayed from one jet nozzle with compressed air, and water is sprayed from the other jet nozzle with compressed air.

4. A treating method for keeping food fresh of claim 1, wherein one jet nozzle is provided in the enclosed container, both the wasabi solution and the water are led into the jet nozzle, and mixed in the jet nozzle just before injection, and then sprayed from the nozzle with compressed air.

5. A treating method for keeping food fresh of claim 3, wherein a baffle plate is provided before the pair of jet nozzles such that liquid drops of a first particle size of wasabi solution and water right after spraying collide against the baffle plate, and collided liquid drops drip downward and discharge from the enclosed container, while liquid drops of a particle size of wasabi solution and water smaller than the first particles are dispersed in the enclosed container in a suspended state.

6. A treating method for keeping food fresh of claim 4, wherein a baffle plate is provided before the jet nozzle such that liquid drops of a first particle size of wasabi solution and water right after spraying in a mixed state collide against the baffle plate, and collided liquid drops drip downward and discharge from the enclosed container, while liquid drops of a particle size of wasabi solution and water in a mixed state smaller than the first particles are dispersed in the enclosed container in a suspended state.

7. A treating method for keeping food fresh of claim 1, wherein opening or closing of the enclosed container is detected by a sensor, and wasabi solution and water are sprayed every time the enclosed container is closed.

8. A treating method for keeping food fresh of claim 1, wherein concentration of the wasabi gas in the enclosed container is detected, and the wasabi solution and water are sprayed so that the wasabi gas concentration in the enclosed container is maintained at a specific value.

9. A treating method for keeping food fresh of claim 1, wherein the wasabi solution and water are sprayed at specified time intervals by means of a timer.

* * * * *